(12) United States Patent
Borutta et al.

(10) Patent No.: US 10,339,784 B2
(45) Date of Patent: Jul. 2, 2019

(54) METHOD AND SYSTEM FOR MONITORING SENSOR DATA OF ROTATING EQUIPMENT

(71) Applicant: SIEMENS AKTIENGESELLSCHAFT, München (DE)

(72) Inventors: Felix Borutta, Oberpframmern (DE); Thomas Hubauer, Garching bei München (DE); Peer Kröger, Oberpframmern (DE)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 15/623,409

(22) Filed: Jun. 15, 2017

(65) Prior Publication Data

US 2017/0365155 A1    Dec. 21, 2017

(30) Foreign Application Priority Data

Jun. 17, 2016 (EP) .................................... 16174902
Jul. 7, 2016 (EP) .................................... 16178412

(51) Int. Cl.
*G08B 21/00* (2006.01)
*G08B 21/18* (2006.01)
(Continued)

(52) U.S. Cl.
CPC ....... *G08B 21/187* (2013.01); *G05B 23/0221* (2013.01); *G05B 23/0254* (2013.01);
(Continued)

(58) Field of Classification Search
CPC .... G08B 21/187; G07C 3/02; G05B 23/0221; G05B 23/0254; G05B 2219/32201;
(Continued)

(56) References Cited

U.S. PATENT DOCUMENTS 7,555,399 B1 * 6/2009 Nikovski ............. G06K 9/0055
  702/116
8,311,774 B2 * 11/2012 Hines ...................... G06F 11/30
  702/182

(Continued)

OTHER PUBLICATIONS

Extended European Search Report dated Nov. 3, 2017—Application No. 16178412.9.

(Continued)

*Primary Examiner* — Kerri L McNally
*Assistant Examiner* — Thang D Tran
(74) *Attorney, Agent, or Firm* — Schmeiser, Olsen & Watts, LLP

(57) ABSTRACT

A sensor data stream is provided consisting of feature vectors acquired by sensors of rotating equipment, similar feature vectors are aggregated in microclusters. For newly arriving feature vectors, a correlation distance measure between the new feature vector and each microcluster is calculated. If there is no microcluster in range, then a new microcluster is created. Otherwise, the feature vector is assigned to the best fitting microcluster, and the necessary statistical information is incorporated into the aggregation contained in the microcluster. In other words, similar feature vectors are aggregated in the same microclusters. The microclusters thus provide a generic summary structure that captures the necessary statistical information of the incorporated feature vectors. At the same time, the loss of accuracy is quite small. Clustering the sensor data stream with microclusters has the benefit that the computational complexity can be reduced significantly.

20 Claims, 3 Drawing Sheets

Figure 1:
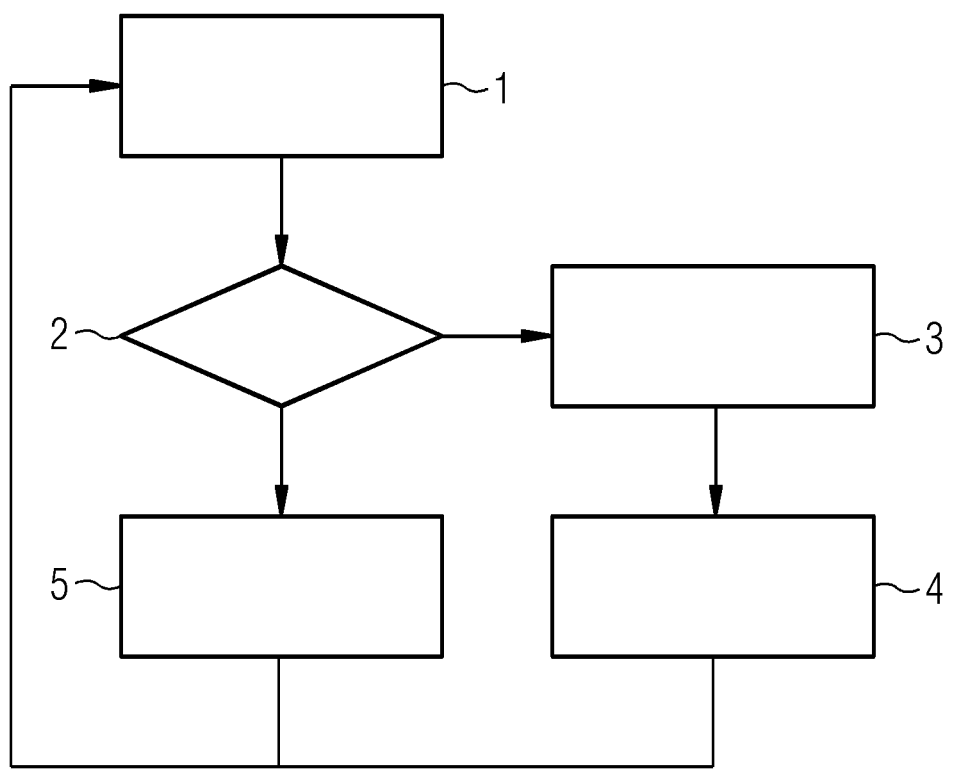

(51) Int. Cl.
*G07C 3/02* (2006.01)
*G06K 9/62* (2006.01)
*G05B 23/02* (2006.01)
*G06N 5/02* (2006.01)
*G06N 20/00* (2019.01)

(52) U.S. Cl.
CPC ......... *G06K 9/6247* (2013.01); *G06K 9/6272* (2013.01); *G07C 3/02* (2013.01); *G05B 2219/32201* (2013.01); *G06N 5/02* (2013.01); *G06N 20/00* (2019.01); *Y02P 90/22* (2015.11)

(58) Field of Classification Search
CPC .... G06K 9/6247; G06K 9/6272; Y02P 90/22; G06N 5/02; G06N 99/005; G06N 20/00
USPC ........................................................ 340/679
See application file for complete search history.

(56) References Cited

U.S. PATENT DOCUMENTS

| | | | | |
|---|---|---|---|---|
| 2002/0065633 A1* | 5/2002 | Levin | .................... | B82Y 15/00 702/189 |
| 2003/0040878 A1* | 2/2003 | Rasmussen | .............. | G01D 3/08 702/85 |
| 2003/0110148 A1* | 6/2003 | Ulyanov | ............ | B60G 17/0182 706/2 |
| 2005/0081410 A1* | 4/2005 | Furem | .................... | E02F 9/267 37/379 |
| 2006/0235599 A1* | 10/2006 | Mukherjee | ......... | G05B 23/0254 701/100 |
| 2007/0088550 A1* | 4/2007 | Filev | .................. | G05B 23/0221 704/245 |
| 2007/0260656 A1* | 11/2007 | Wiig | ...................... | G01H 1/003 708/200 |
| 2008/0177513 A1* | 7/2008 | Miller | ................ | G05B 23/0254 703/2 |
| 2008/0188972 A1* | 8/2008 | Miller | ................ | G05B 19/4184 700/110 |
| 2008/0205774 A1* | 8/2008 | Brinker | ............ | G06F 17/30707 382/225 |
| 2008/0208429 A1* | 8/2008 | Saravanapriyan | ...... | F01K 13/02 701/100 |
| 2009/0149981 A1* | 6/2009 | Evans | ................ | G05B 23/0254 700/110 |
| 2009/0295561 A1* | 12/2009 | Hu | .................. | G05B 19/41875 340/501 |
| 2010/0023307 A1* | 1/2010 | Lee | .................... | G05B 23/0254 703/7 |
| 2011/0191076 A1* | 8/2011 | Maeda | ............... | G05B 23/0254 703/2 |
| 2012/0161965 A1* | 6/2012 | Babu | ........................ | F02C 9/00 340/540 |
| 2012/0271587 A1* | 10/2012 | Shibuya | ............. | G05B 23/0229 702/127 |
| 2012/0317058 A1* | 12/2012 | Abhulimen | ............ | G06N 20/00 706/2 |
| 2013/0201191 A1* | 8/2013 | Morinaga | ......... | G06F 17/30994 345/440 |
| 2014/0279795 A1* | 9/2014 | Shibuya | ............. | G05B 23/0254 706/46 |
| 2015/0025814 A1* | 1/2015 | Giannini | ............ | G05B 23/0216 702/35 |
| 2015/0220847 A1* | 8/2015 | Shibuya | ................. | G06N 5/047 706/12 |
| 2015/0363925 A1* | 12/2015 | Shibuya | ............. | G05B 23/0235 345/440 |
| 2016/0239755 A1* | 8/2016 | Aggour | ............... | G05B 23/0229 |
| 2017/0004362 A1* | 1/2017 | Arunkumar | ........ | G06K 9/00523 |
| 2017/0082988 A1* | 3/2017 | Ross | ................ | G05B 19/41885 |
| 2017/0359366 A1* | 12/2017 | Bushey | ................... | H04L 67/10 |
| 2018/0059656 A1* | 3/2018 | Hiruta | .................... | G05B 23/02 |

OTHER PUBLICATIONS

Irene Ntoutsi, Arthur Zimek, Themis Palpanas, Peer Kröger, Hans-Peter Kriegel, "Density-based Projected Clustering over High Dimensional Data Streams", Institute for Informatics, Ludwig-Maximilians-Universität München, Germany; Information Engineering and Computer Science Department (DISI), University of Trento, Italy, 2012.

Y. Li. On incremental and robust subspace learning. Pat-tern recognition, 37(7):1509-1518, 2004.

C. C. Aggarwal and P. S. Yu. Finding generalized projected clusters in high dimensional spaces, vol. 29. 2000.

M. Ester, H.-P. Kriegel, J. Sander, and X. Xu. A density-based algorithm for discovering clusters in large spatial databases with noise. In Kdd, vol. 96, pp. 226-231, 1996.

E. Achtert, C. Böhm, H.-P. Kriegel, P. Kröger, and A. Zimek. On exploring complex relationships of correlation clusters. In Scientific and Statistical Database Management, 2007. SSBDM'07. 19th International Conference on, pp. 7-7, 2007.

E. Achtert, C. Böhm, H.-P. Kriegel, P. Kröger, A. Zimek, et al. Robust, complete, and efficient correlation clustering. In SIAM, pp. 413-418, 2007.

C. Böhm, K. Kailing, clusters of correlation connected objects. In Proceedings of the 2004 ACM SIGMOD international conference on Management of data, pp. 455-466, 2004;P. Kröger, and A. Zimek. Computing.

* cited by examiner

METHOD AND SYSTEM FOR MONITORING SENSOR DATA OF ROTATING EQUIPMENT

CROSS-REFERENCE TO RELATED APPLICATIONS

This application claims priority to EP Application No. 16178412.9, having a filing date of Jul. 7, 2016, which is based upon and claims priority to EP Application No. 16174902.3, having a filing date of Jun. 17, 2016, the entire contents both of which are hereby incorporated by reference.

FIELD OF TECHNOLOGY

The following relates to monitoring, e.g. condition monitoring, of rotating equipment. Rotating equipment encompasses any rotatory driven equipment in technical plants or facilities, such as pumps, fans, compressors and turbines.

BACKGROUND

Modern turbines are equipped with a large number of sensors that monitor the current status. Often, this data is transmitted as a sensor data stream to a so-called "Remote Diagnostic Center" (RDC) where engineers use dashboards to monitor aggregated device status and diagnose detected errors.

Experience shows that humans often use knowledge of similar cases from the past to diagnose and solve new issues. However, the sheer amount and velocity of sensor data (and derived events) arriving at the RDC make it impossible for a human to investigate the full data manually.

SUMMARY

According to an embodiment of a method for monitoring sensor data of rotating equipment, the following steps are executed: processing a sensor data stream consisting of an ordered sequence of feature vectors, each feature vector representing measurements of sensors of the rotating equipment at a certain point in time; representing the sensor data stream with a set of microclusters, each microcluster defining a subspace; for each new feature vector of the sensor data stream, updating the set of microclusters by calculating a correlation distance measure between the new feature vector and each microcluster, and assigning the new feature vector to a microcluster with a smallest value for the correlation distance measure if the value is below a range parameter and updating the microcluster based on the new feature vector, or creating a new microcluster based on the new feature vector if all values for the correlation distance measure are above the range parameter.

The following advantages and explanations are not necessarily the result of the object of the independent claims. Rather, they may be advantages and explanations that only apply to certain embodiments or variants.

The sensor data stream is a potentially infinite, ordered sequence of incoming data points that are acquired by physical or virtual sensors of the rotating equipment. These data points will be called features vectors or objects in the following and must be accessed in the order they arrive. The sensor data stream and the feature vectors can be high-dimensional.

For a possible implementation of the microclusters, see Definition 2 further below. For example and with regard to Definition 2, the subspace of a microcluster may be defined using the eigenvector matrix $V(t)$ in conjunction with the corresponding eigenvalues $E(t)$. The subspace may then be formed by discarding weak eigenvalues and their associated eigenvectors, with the remaining strong eigenvectors spanning a lower dimensional subspace. One possible formal definition of this kind of correlation subspace is given further below in Definition 3.

Clusters are different groups of similar objects. The method proposes a continuous online phase, in which similar feature vectors are aggregated in microclusters. Newly arriving feature vectors are assigned to the best fitting microcluster with regard to a correlation distance measure, and the necessary statistical information is incorporated into the aggregation contained in the microcluster. In other words, similar feature vectors are aggregated in the same microclusters. The microclusters thus provide a generic summary structure that captures the necessary statistical information of the incorporated feature vectors. At the same time, the loss of accuracy is quite small.

For a possible implementation of the updating step of the method, see Algorithm 2 further below. A possibility for calculating the correlation distance measure is given in Definition 5 further below.

Clustering the sensor data stream with microclusters has the benefit that the computational complexity can be reduced significantly. This allows algorithms that implement the method to cope with high-velocity sensor data streams that push new feature vectors within milliseconds to the application. Furthermore, clustering has the advantage of being an unsupervised learning method.

The method allows for automatically analyzing the sensor data stream. It extends correlation clustering to data streams, thereby allowing for an online-monitoring of rotating equipment such as turbines.

The microclusters compress all the necessary statistical information that is required to build the clustering model. They allow a very fast computation of the model and at the same time there is no need to store all the data gathered by the sensors of a machine. Furthermore, due to the microclusters representing subspaces effectively, they further allow a fine grained comparison of feature subspaces which in turn can give a deep insight into the state of a machine. When combining these structures with an appropriate similarity measure, this technique can be used for an automated monitoring system or a system for recommendations on failure treatment either by monitoring the evolution of such microclusters or by comparing clustering models in total.

An embodiment of the method comprises the additional step of detecting the possibility of a failure in real time, if a change of orientation of the subspace of at least one of the microclusters exceeds a threshold, or if at least one new microcluster has been created.

This embodiment monitors the evolution of the microclusters and provides a real time monitoring system. The embodiment can be used as a key mechanism to detect shifts or drifts from a standard operational state to a failure state, including abrupt failures. Newly arising microclusters or microclusters whose subspaces change their orientations significantly may indicate an abrupt failure.

For implementing the detecting step, the subspace $S(t)$ of a microcluster at a first point in time t can be compared with the subspace $S(t')$ of the same microcluster at a later point in time t' using the distance measure from Definition 9 further below, for example.

An embodiment of the method comprises the additional step of detecting the possibility of a failure in real time by continuously comparing newly created microclusters with a database containing microclusters representing known failure states.

Using this database containing previously trained microclusters for normal and abnormal operational regimes allows to monitor system behavior and issue an early warning when the rotating equipment deviates from standard operational patterns.

In an embodiment of the method, each microcluster comprises a mean vector of feature vectors contained in the microcluster, a timestamp of the last incoming feature vector assigned to the microcluster, a buffer containing incoming feature vectors, if the microcluster has not been initialized, and an eigenvector matrix containing eigenvectors, and eigenvalues for the eigenvectors, if the microcluster has already been initialized.

According to an embodiment of the method, an Euclidean distance between the new feature vector and the mean vector of the microcluster is calculated for microclusters that have not been initialized, instead of calculating the correlation distance measure.

In those cases, the correlation measure cannot be applied due to the lack of the microcluster's eigenspace.

According to an embodiment of the method, updating the microcluster based on the new feature vector comprises the alternatives of: if the microcluster has not been initialized, inserting the new feature vector into its buffer, recalculating its mean vector and updating its timestamp, and if the buffer is now filled, initializing the microcluster by performing an initial Principal Component Analysis to calculate its eigenvectors and eigenvalues, or if the microcluster has already been initialized, performing an incremental Principal Component Analysis to recalculate its eigenvectors and eigenvalues, recalculating its mean vector and updating its timestamp.

According to an embodiment of the method, the incremental Principal Component Analysis uses an exponential fading function assigning each feature vector a weight which decreases exponentially with time.

An embodiment of the method comprises an additional step of periodically scanning the set of microclusters and deleting microclusters whose timestamp is older than a threshold value.

An embodiment of the method comprises an additional offline phase which includes creating a macrocluster model containing macroclusters based on the microclusters by calculating a comparison measure between each pair of microclusters and grouping microclusters in a macrocluster if their value of the comparison measure is below a threshold.

This embodiment allows to construct a high quality macrocluster model that describes the correlations appearing in the sensor data stream. For that purpose, the embodiment provides an offline routine capable of building macroclusters on top of the generated microcluster structures retrieved by the online process.

According to an embodiment of the method, the macrocluster model is created by partitioning the set of microclusters, computing the macroclusters within each partition, and building a hierarchy of the macroclusters. A variant of this embodiment includes the additional step of merging related macroclusters from different partitions.

According to an embodiment of the method, the comparison measure is calculated by comparing an orientation of the subspaces of the microclusters and grouping microclusters if the difference of the orientation of their subspaces is below a threshold.

The basic idea of this embodiment is to use the orientation of the microclusters given by their eigenvectors to group those microclusters whose eigenvectors span a similar subspace.

According to an embodiment of the method, the comparison measure computes a composition of an approximate linear dependency and an affine distance between two microclusters.

For example, the correlation distance from Definition 8 further below can be used as the comparison measure, including Definition 6 of the approximate linear dependency and Definition 7 of the affine distance.

An embodiment of the method comprises the additional step of comparing the macrocluster model with historical models by calculating a similarity measure, with each historical model representing either a standard operation or a failure state.

In other words, the microclusters are translated into a macrocluster model, which can then be compared offline and in total with a library of historical models for diagnosis. Having such a database that stores as historical models documented historical operation patterns of rotating equipment such as a turbine, e.g. standard operation, loosened screw, etc., the macrocluster model extracted during the offline phase can be compared with the historical models stored in the database and the most similar model can be retrieved. In case of documentation, a technician can determine the kind of failure in this way and is able to introduce following step, e.g. stopping the turbine. Using the macrocluster model for offline comparison in certain time intervals or on demand, even insidious failures can be detected.

The offline phase can be initiated either on demand—if a technician detects a failure state of the rotating equipment he can request a current macrocluster model representing the current state on demand—or periodically.

The embodiment allows detecting arbitrarily oriented linear correlation clusters within the sensor data stream.

An embodiment of the method comprises the additional step of ranking the historical models according to the value of the similarity measure, and outputting a ranked list of the historical models with the highest values of the similarity measure.

The historical models can be annotated with semantic information, such as a name for the failure state and recommended action.

Another embodiment of the method comprises the additional step of choosing the historical model with the highest value of the similarity measure, and detecting a failure if the chosen historical model represents a failure state.

Another embodiment of the method employs an ageing mechanism to forget an influence of old parts of the sensor data stream to the microclusters. This keeps the microclusters permanently up to date. As an example of the ageing mechanism, the method can be used.

The System for monitoring sensor data of rotating equipment comprises one or more processors which are programmed to perform the method.

The computer-readable storage media has stored thereon instructions executable by one or more processors of a computer system, wherein execution of the instructions causes the computer system to perform the method.

The computer program is being executed by one or more processors of a computer system and performs the method.

BRIEF DESCRIPTION

Figure 2:
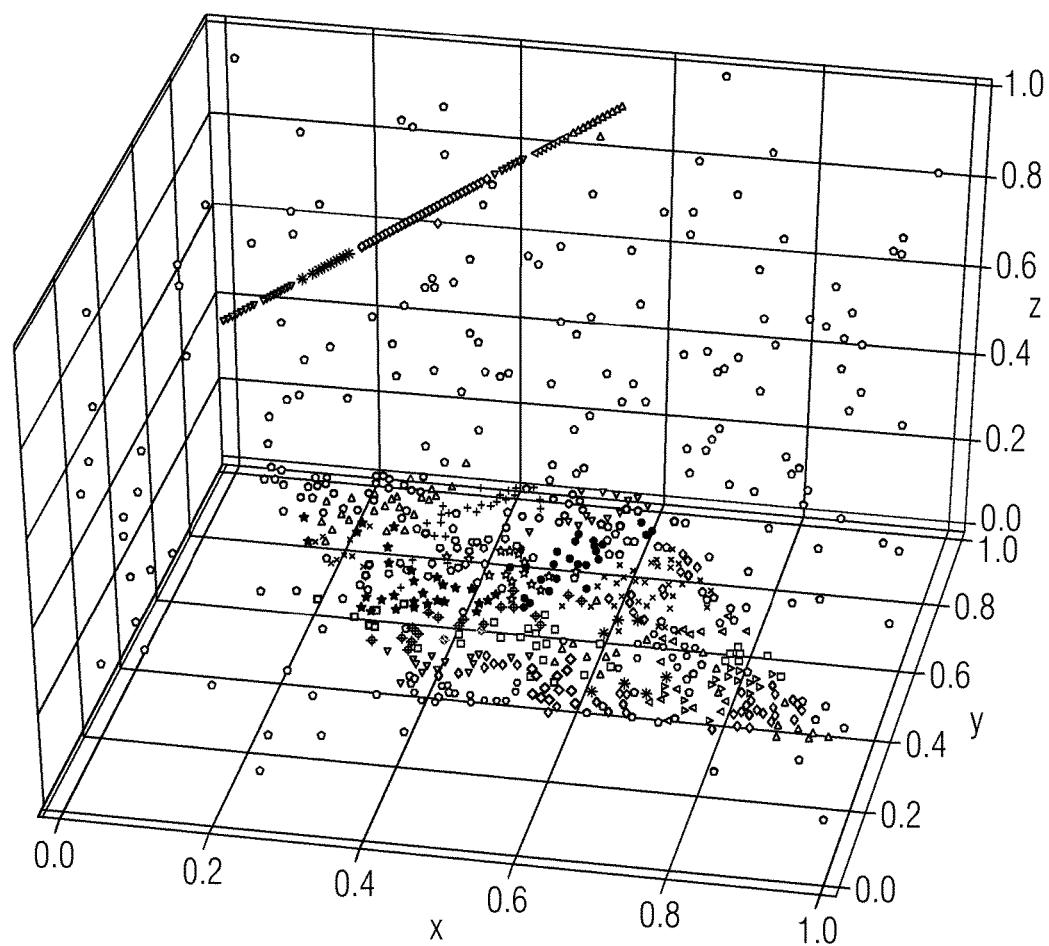

Some of the embodiments will be described in detail, with reference to the following figures, wherein like designations denote like members, wherein:

FIG. 1 a flowchart of an embodiment of the method;
FIG. 2 microclusters as retrieved during an online phase; and
FIG. 3 a macrocluster model as retrieved after an offline phase.

DETAILED DESCRIPTION

The Principal Component Analysis (PCA) is a popular tool to compute the principal components of a data matrix by using an orthogonal transformation. As a form of true eigenvector-based multivariate analysis, it reveals an uncorrelated orthogonal basis vector set such that the underlying data has the maximum possible variance in the directions of the principal components. Each vector of the basis represents an eigenvector of the underlying covariance matrix. The first principal component is the eigenvector that has the largest possible variance, i.e. the largest eigenvalue, and further principal components maximize the variance with respect to the constraint that they build an orthogonal system.

In terms of correlation clustering, previously presented methods often use the PCA to detect correlation clusters. To formalize the idea of correlation clusters, we borrow the notions used in [1] and [2].

Let D be a dataset of n d-dimensional feature vectors, i.e. $D \subseteq \mathbb{R}$. Let C be a correlation cluster, i.e. $C \subseteq D$, and $\overline{X}$ denote the centroid of all points in C. The d×d covariance matrix $\Sigma_C$ of C is defined as:

$$\Sigma_C = \frac{1}{|C|} \cdot \sum_{x \in C} (x - \overline{X}) \cdot (x - \overline{X})^T.$$

Due to $\Sigma_C$ being a positive, semi-definite square matrix, it can be diagonalized, e.g. by an eigenvalue decomposition, such that $\Sigma_C = V_C E_C V_C^T$ holds. $E_C$ denotes the eigenvalue matrix which is a diagonal matrix that stores the d positive eigenvalues of $\Sigma_C$ in decreasing order. $V_C$ is the corresponding orthonormal eigenvector matrix with each column denoting an eigenvector of $\Sigma_C$. Finally, the eigenvector associated with the first (largest) eigenvalue is the first principal component. This means that the underlying data has its maximum variance, i.e. it carries most information, in the direction of this vector compared to the other eigenvectors. However, some of the eigenvalues might be close to zero, resp. lower than a threshold value $\delta \geq 0$, which means that there are dimensions in the eigenspace that barely carry information. By discarding such weak eigenvalues and their associated eigenvectors, the remaining strong vectors of the eigensystem form a lower dimensional subspace. In the following, we call such subspaces $\lambda_C$-dimensional subspaces, where $\lambda_C \leq d$ denotes the number of strong eigenvectors of the feature space defined by C.

Since the subset $C \subseteq D$ might not be "complete" by the time the principal components are computed in a stream clustering environment, it is required to be able to update a $\lambda_C$-dimensional subspace whenever incoming data objects fit into the correlation cluster C.

Recomputing the PCA from scratch each time a potential correlation cluster gets a new cluster member would be prohibitively expensive in terms of computational costs. A proven mean to overcome this issue in general are incremental approaches.

Incremental PCA (IPCA) has been studied extensively, mostly in the area of computer vision and in the machine learning community. In general, there are two categories of IPCA algorithms. The first one is covariance-free techniques that cope without the computation or reconstruction of the covariance matrix. The algorithms from the second category approximately reconstruct the covariance matrix from the previously computed eigenvectors and eigenvalues. By adding a new observation, the dimension of the subspace is increased by one. But since least significant principal components are discarded, the dimension of the subspace is kept small which makes these approaches computational efficient. Although these methods suffer from unpredicted approximation errors, we use the basic algorithm presented in Algorithm 1 from [12] because of its good real-time performance. Experiments show that this technique can sufficiently cope with high velocity data streams.

---

Algorithm 1 Incremental PCA

Input: Data Stream S, Weight parameter τ
Output: Current Eigensystem $eig_i$, composed of eigenvector matrix $V_i$ and eigenvalue matrix $E_i$
1:    $V_0, E_0$: = initial PCA from the first init observations
2:    $\mu_0$: = mean of the first init observations
3:    while S does not end do
4:        $x_i'$: = next incoming observation from S:
5:        $x_i = x_i' - \mu_{i-1}$
6:        $\mu_i = \mu + (1 - \tau) \cdot x_i$
7:        for j ∈ range(0,col($V_{i-1}$)) do
8:            $y_j = \sqrt{\tau E_{i-1}(j,j)} \cdot V_{i-1}(:,j)$
9:        end for
10:      $y_{col(V_{i-1})} = \sqrt{1-\tau} \cdot x_i$
11:      $A = [y_0, y_1, ..., y_{col(V_{i-1})}]$
12:      $B = A^T A$
13:      $U, E_i$ = Eigen – decompose B
14:      for j ∈ range(0,col(U)) do
15:          $v_j = A \cdot U(:,j)$
16:      end for
17:      $V_i = [v_1, v_2, ..., v_{col(U)}]$
18:    end while

---

Algorithm 1 proceeds as follows: First, after collecting an initialization set I of init observations, an initial PCA yielding the eigenvector matrix $V_0$ and eigenvalue matrix $E_0$, is performed on I. Note that init can be chosen arbitrarily in $\mathbb{R}_0^+$. If init=0, $V_0$ must be set to be the d×1 null vector with d being the dimension of the regarded feature space. Accordingly, the eigenvalue in the 1×1 matrix $E_0$ can be set arbitrarily. The initial mean value is either set to be the null vector if init =0, or it is the mean of all observations in I. After the initialization, the initial eigenspace is updated incrementally with each incoming observation from data stream S. Whenever a new observation arrives, it gets mean normalized, i.e. $x_i$, and the current mean $\mu_i$ is determined. The parameter $\alpha \in [0, 1]$ is used as a weight that denotes the importance of a new observation compared to the previously seen ones. The larger a, the less important is a new observation $x_i$. Next, a d×col($V_{i-1}$)+1 matrix A is defined, with col($V_{i-1}$) denoting the number of columns of the eigenvector matrix $V_{i-1}$. The first col($V_{i-1}$) columns of A are constructed from the weighted previous principal components and the weighted current observation forms the last column. Using matrix A, we can reconstruct the new d×d covariance matrix C expressed by $C = AA^T$. Since a high dimension d leads to high computational costs, a smaller (col($V_{i-1}$)+1)×(col($V_{i-1}$)+1) matrix $B = A^T A$ is constructed and then decomposed on the rank of col($V_{i-1}$)+1.

The eigen-decomposition retrieves the eigenvalue matrix $E_i$ and the eigenvector matrix U. Multiplying each eigenvector of U with matrix A finally retrieves the eigenvectors of the covariance matrix C with the eigenvalues contained in $E_i$. For the mathematical derivations of the single steps, we refer to [12]. Note that the updating process of the eigenspace is based on reconstructing the covariance matrix C by using the eigenvectors gained from the previous update. Since commonly, in each step only the most significant eigenvectors are selected to cap the dimension of the eigenspace, this procedure is approximating the covariance matrix with an unpredicted error. However, our experiments show that the loss of accuracy hardly affects the clustering result.

As this work concentrates on streaming data, we use a common definiton of data streams.

Definition 1. A data stream S is an ordered and possibly infinite sequence of data objects $x_1, x_2, \ldots, x_i, \ldots$ that must be accessed in the order they arrive and can be read only in one linear scan (or a few if necessary).

Another concept used for our purpose is the damped window model. Since recent data is typically more expressive than old data objects, especially if an up-to-date clustering model is desired, it is useful to "forget" stale data. Therefore, a widely used approach in applications dealing with temporal data is the utilization of the exponential fading function for data ageing. This technique assigns a weight to each data object which decreases exponentially with time t by using the fading function $f(t)=2^{-\lambda \cdot t}$. $\lambda>0$ is the decay rate and determines the impact of stale data to the application. A high value of $\lambda$ means low importance of old data and vice versa.

Previously presented correlation clustering methods that are able to find strong, linear and arbitrarily oriented subspace clusters in static datasets all describe the useful characteris-tics of a data object based on its neighboring objects. This requires to keep all data objects in storage which is generally infeasible in terms of streaming application. Since data may arrive with high velocity, stream algorithms are limited to the main memory for being able to process data as fast as possible. To overcome this problem, a common approach in stream algorithms is to aggregate data in an appropriate summary structure. Microclusters summarize the information of an entire set of data objects, are kept in main memory as compact representations and are used for further processing steps.

Besides finding an appropriate microcluster structure that encapsulates the necessary information, such structures also have to fulfill two basic properties, i.e. additivity and, when considering data ageing, temporal multiplicity. These properties are crucial in order to maintain the microclusters in the online step. For our purpose, we define a microcluster as follows:

Definition 2. A microcluster at time t for a set of d-dimensional points $C=\{p_1, p_2, \ldots, p_n\}$ arriving at different points in time is defined as $mc(C, t)=(V(t), E(t), \mu(t), ts)$ with V(t) being the eigenvector matrix of the covariance matrix of C at time t, E(t) being the corresponding eigenvalues of the eigenvectors in V(t), $\mu(t)$ being the mean of the data points contained in C at time t and ts being the timestamp of the last incoming object assigned to this microcluster.

This structure is valid in the sense that both required properties concerning the online maintenance can be fulfilled:

Additivity: Due to the limited amount of main memory, it is necessary to reduce the number of microclusters occasionally. Therefore, microclusters whose eigenvectors span equal (or similar) subspaces must be merged in a way that two micro-clusters $mc(C, t_c)=(V(t), E(t), \mu(t), t_c)$ and $mc(C', t_{c'})=(V(t)', E(t)', \mu(t)', t_{c'})$ form the microcluster $mc(C \cup C', t)=(V(t) \oplus V(t)', E(t) \oplus E(t)', \mu(t) \oplus \mu(t)', t)$ with $\oplus$ being an appropriate merge operation and $t=\max(t_c, t_{c'})$. Let us note that this operation particularly allows to add single data objects to an existing microcluster as well.

Temporal Multiplicity: If a new data point p arrives at time t and is assigned to the best fitting microcluster $mc(C, t-\Delta t)$ with $\Delta t \geq 0$, i.e. a microcluster that did not absorb a data point for some time $\Delta t$, the components of $mc(C, t-\Delta t)$ are downgraded by the weight parameter $\tau$ used in the IPCA algorithm. The parameter $\tau$ determines the ratio of importance between previously seen data and the current data point. We propose to define $\tau$ as the commonly used exponential decay function $\tau=2^{-\beta \cdot \Delta t}$ with $0 \leq \beta \leq 1$ being the learning rate of the process. In our application, this means the larger $\beta$ is chosen, the more influence has a new arriving data object on the eigenspace of the microcluster it is assigned to.

In the eigenvector matrix V of our microcluster structure, we generally differ between two types of eigenvectors, i.e. the strong eigenvectors and the weak eigenvectors. The strength of an eigenvector is given by the variance along this axis in the eigenspace. We define strong eigenvectors as follows [1]:

Definition 3. Let $\alpha \in [0, 1]$, mc be a microcluster, V its eigenvector matrix and E its d×d eigenvalue matrix having the eigenvalues in descending order on the diagonal. We call the first $$\min_{r \in \{1, \ldots, d\}} \left\{ r \mid \frac{\sum_{i=1}^{r} E(i, i)}{\sum_{i=1}^{d} E(i, i)} \geq \alpha \right\}$$

eigenvectors strong eigenvectors resp. preference vectors and the remaining eigenvectors are called weak eigenvectors. The space spanned by the preference vectors is called correlation subspace.

In the following, an embodiment for correlation clustering on streaming data is described, and in particular the maintenance of microclusters in an online phase.

The algorithm CORRSTREAM presented in this section consists of two phases, i.e. an online phase in which microclusters are generated, maintained and/or discarded due to temporal expiration and an offline phase to extract on demand clustering models of the current state of the stream.

---

Algorithm 2 Online

Input: Data Stream S, range parameter $\in$, buffer size buff_size, decay parameter $\lambda$
1:     for incoming data object o from S at time t do
2:         Microcluster $mc_{NN}$ = rangeNN(o, $\in$)
3:         if $mc_{NN} \neq$ null then
4:             add <o, t> to $mc_{NN}$ -continued Algorithm 2 Online

```
5:      else
6:          create new microcluster with parameters buff_size, λ and add <o, t>
8:      end if
8:  end for
```

During the continuous online phase, referenced in Algorithm 2, the data stream is consumed and for each data object o a rangeNN query is performed to detect the closest microcluster. The rangeNN query takes the current data object as query object and the ∈ parameter as a distance bound. As a result, the rangeNN query retrieves the closest microcluster with a maximum distance of ∈. If such a microcluster exists, it absorbs the current data object o, otherwise a new microcluster is created. Beside of the components that fulfill the maintenance properties, each microcluster has an initial buffer. This buffer is a small collection of data objects that serves as a basis for an internal initialization step. The intuition behind that is to collect a bunch of spatially close data objects for which an initial PCA is performed. The PCA retrieves the eigenspace, i.e. eigenvectors and eigenvalues, of those data objects. Applying Definition 3, we can define the strong eigenvectors of the microcluster which span the correlation subspace. Since a single data object or a few are not able to exhibit proper resp. meaningful preference vectors, the buffer size should not be chosen smaller than the dimensionality of the full data space.

Another view of Algorithm 2 is shown in the flowchart of FIG. 1. According to FIG. 1, the rangeNN query is performed in a calculating step 1 that calculates a correlation distance measure between the new feature vector (the incoming data object o) and each microcluster. The rangeNN query searches for the microcluster with the smallest value for the correlation distance measure. If that value is below the range parameter e, then the rangeNN query delivers that microcluster. If, however, all values for the correlation distance measure are above the range parameter ∈, then the rangeNN query returns null. An evaluation step 2 checks the result of the rangeNN query. If the result is a microcluster, then the new feature vector will be added to that microcluster in an assigning step 3, which includes updating the microcluster based on the new feature vector in an updating step 4. If the result of the rangeNN query is null, then a new microcluster based on the new feature vector is created in a creating step 5. The algorithm then proceeds with the next incoming feature vector by returning to the calculating step 1.

Algorithm 3 rangeNN

```
Input: data object o, range parameter ∈
Output: nearest microcluster of o
1:      min_dist := MAX_VALUE
2:      min_mc := null
3:      for each existing microcluster mc do
4:          if mc is already initialized then
5:              dist := distance_corr(mc, o)
6:          else
7:              dist := distance_eucl(μ_mc, o)
8:          end if
9:          if dist < ∈ ∧ dist < min_dist then
10:             min_dist ⁻ dist
11:             min_mc ⁻ mc
12:         end if
13:     end for
14:     return min_mc
```

Algorithm 3 shows the basic pseudocode of the rangeNN query. For a data object o we compute the distance to each existing microcluster and retrieve the microcluster with the smallest distance to o that is below ∈. This embodiment uses two distance measures, i.e. the Euclidean distance and the correlation distance. The reason for that is the period of grace that we establish for each newly constructed microcluster for the initialization. If the initial PCA have not been done for a microcluster, yet, the correlation measure cannot be applied due to the lack of the microcluster's eigenspace. Therefore, we determine the Euclidean distance between the micocluster's mean point and the incoming data object instead of the correlation distance in such cases. However, to define the correlation distance, which is used in all other cases, we need to define the notion of similarity matrix beforehand.

Definition 4. Let $V_{mc}$ be an eigenvector matrix with $E_{mc}$ being the corresponding eigenvalue matrix of a microcluster mc having onto [0; 1] normalized eigenvalues on the diagonal. Given a threshold value $\alpha \in [0; 1]$ and a constant value with $\kappa \in \mathbb{R}$ with $\kappa \gg 1$, the eigenvalue matrix $E_{mc}$ is adopted by setting those eigenvalues to $\kappa$ whose value is below the threshold value $\alpha$. The values of the resulting matrix $\hat{E}_{mc}$ are computed according to the following rule:

$$\hat{E}_{mc}(i, i) \begin{cases} 1 & \text{if } E_{mc}(i, i) \geq \alpha \\ \kappa & \text{else} \end{cases}$$

Having the adopted eigenvalue matrix $\hat{E}_{mc}$, the similarity matrix is defined as $\hat{M}_{mc} = V_{mc} \hat{E}_{mc} V_{mc}^T$.

Let us note that the constant value $\kappa$ specifies the allowed degree of deviation from the correlation subspace. Following [9], we set this value to $\kappa=50$. The correlation distance can finally be computed as follows.

Definition 5. Given a microcluster mc with mean point $\mu_{mc}$ and a data object o, the correlation distance between both is defined as $$\text{distance}_{corr}(mc, o) = \sqrt{(\mu_{mc} - o) \cdot \hat{M}_{mc} \cdot (o - \mu_{mc})}$$

with $\hat{M}_{mc}$ being the similarity matrix of mc.

After determining the closest microcluster mc of the incoming data object o, the latter must be incorporated into mc properly.

Algorithm 4 add

```
Input: data object o, timestamp ts_o, microcluster mc
Output: updated mc, i.e. mc + o
1:      if mc is not initialized then
2:          buffer.add(o)
3:          μ = update mean
4:          ts_mc ⁻ ts_o
5:          if buffer.size( ) == buff_size then
6:              V,E := perform PCA on buffer
7:              update mc's eigensystem
8:              mark mc as initialized
```

-continued

Algorithm 4 add

```
 9:          end if
10:      else
11:          V, E, μ := perform IPCA by incorporating o with weight
             2^(-λ·(ts_o-ts_mc))
12:          update mc's eigensystem
13:      end if
14:      return mc
```

Algorithm 4 shows the pseudocode of this function. Our proposed algorithm basically differentiates three cases of how to insert a new data object into an existing microcluster. The first two cases are considered if the microcluster mc has not been initialized so far, i.e. the buffer is not filled. In that cases, the object is inserted into the buffer and the mean μ is updated as well as the current timestamp of the microcluster. Note that $ts_o$ denotes the current timestamp of the data object o and $ts_{mc}$ denotes the timestamp of the mc which is the time of the last microcluster update. Afterwards, the algorithm checks whether the buffer is filled now. If not, the insertion terminates by retrieving the updated microcluster. Otherwise, the initialization procedure is triggered and the initial PCA is performed and retrieves the eigensystem of the data objects contained in the buffer. Then, the components of the microcluster structure are set and mc is marked as initialized.

The third option of inserting a new arriving data object is used if the microcluster already has been initialized before. In this case, the existing components of the microcluster are reused and the incremental PCA as given in Algorithm 1 is invoked to generate the new eigenvectors and -values as well as an updated mean vector. As mentioned above, the degree of influence of the new object on the existing eigensystem can be regulated by the weight parameter, i.e. $2^{-\lambda \cdot (ts_o - t_{mc})}$ in the pseudocode. After updating the components of mc, the current state of mc is returned and the algorithm can proceed with the next data object.

Due to the possibility of expiring microclusters, i.e. microclusters that have not absorbed any data object for a while, it might happen that this microcluster has to be deleted since stale data should not sophisticate an up-to-date clustering model on the one hand. On the other hand, because of streaming applications being often limited to a certain amount of memory, it is useful to delete old microclusters to save storage space. As a straightforward solution, we propose to scan the set of microclusters sequentially from time to time and delete those microclusters whose timestamp $ts_{mc}$ is older than a user specified threshold value $\Delta t$, i.e. if $ts_{mc} < ts_{curr} - \Delta t$ with $ts_{curr}$ denoting the current point in time. The choice of an appropriate threshold value $\Delta t$ depends on the velocity of the data stream.

In the following, the generation of a macrocluster model during an offline phase is described.

The main goal of CORRSTREAM is the construction of a high quality clustering model that describes correlations appearing in the data. For that purpose, the algorithm provides an offline routine capable of building macroclusters on top of the generated microcluster structures retrieved by the online process. FIG. 2 depicts the outcoming microcluster model of the online phase for a small synthetic and 3-dimensional data set. As can be seen easily, some of the microclusters can be grouped so that they form two separated macroclusters, i.e. an I-dimensional cluster and a 2-dimensional one. In general, the microcluster structure is generic enough so that a variety of static correlation clustering algorithms can be adopted to build a clustering model based on the retrieved microclusters. In this work, we approach a variant of the ERIC algorithm [1] in detail. Another possibility is a version of CORRSTREAM that uses an adaptation of the ORCLUS algorithm [6].

The algorithm we propose consists of four steps that are (1) partitioning the set of microclusters, (2) computing macroclusters within each partition, (3) building the hierarchy of the clustering and (4) defining cross-partition macroclusters which is optional. In the first step, we partition the set of microclusters according to the dimensionality of their subspaces. Regarding the example data set from FIG. 2, the microclusters which form the 1-dimensional line cluster would be in one partition, and the microclusters which form the 2-dimensional plane would be in another partition for instance. Technically, the partitioning process is done by counting the number of strong eigenvectors contained in the eigenvector matrix of each microcluster. After dividing the set of microclusters into disjoint partitions, the algorithm determines macroclusters within each partition. Therefore, we apply a DBSCAN [11] variant capable of dealing with the structure of the microclusters. The basic idea is to use the orientation of the microclusters given by the eigenvectors to group those microclusters whose eigenvectors span a similar subspace. According to [1], we define the correlation distance used for the spatial queries in the offline phase as the composition of the approximate linear dependency and the affine distance between two microclusters.

Definition 6. Given a threshold value $\Delta \in ]0;1[$ and two microclusters $mc_i$ and $mc_j$, with $mc_i$ having less or as many strong eigenvectors as $mc_j$, $mc_i$ is called approximately linear dependent from $mc_j$ if $$\sqrt{v_i^T \cdot V_{mc_j} \cdot \hat{E}_{mc_j} \cdot V_{mc_j}^T \cdot v_i} \leq \Delta$$

with $\hat{E}_{mc_j}$ being the adopted eigenvalue matrix of $mc_j$ according to $$\hat{E}_{mc}(x,x) \begin{cases} 1 & \text{if } E_{mc}(x,x) \geq \alpha \\ 0 & \text{else} \end{cases}$$

holds for all strong eigenvectors $v_i$ of $mc_i$.

Since perfect correlations usually do not appear in real world data, the threshold value $\Delta$ is introduced to allow a certain degree of deviation from an absolute linear dependency between two microclusters.

Definition 7. Let $mc_i$ and $inc_j$ be two microclusters with $mc_i$ having less or as many strong eigenvectors as $mc_j$ and let $mc_i$ be approximately linear dependent from $mc_j$. Then, the affine distance between $mc_i$ and $mc_j$ is defined as $$\text{distance}_{aff}(mc_i, mc_j) = \sqrt{(\mu_{mc_i} - \mu_{mc_j})^T \cdot V_{mc_j} \cdot \hat{E}_{mc_j} \cdot V_{mc_j}^T \cdot (\mu_{mc_i} - \mu_{mc_j})},$$

with $\hat{E}_{mc_j}$ being defined as in Definition 6 and $\mu_{mc}$ being the mean of microclustser mc.

Combining Definitions 6 and 7, and assuming the premise that two microclusters with parallel subspaces form a joint cluster if the affine distance is below a threshold value $\delta \in \mathbb{R}_0^+$, we define the correlation distance for the offline phase as follows.

Definition 8. Let $\delta \in \mathbb{R}_0^+$, $\Delta \in ]0;1[$ and let $mc_i$ and $mc_j$ be two microclusters with $mc_i$ having less or as many strong eigenvectors as $mc_j$. The correlation distance between $mc_i$ and $mc_j$, i.e. $\text{CorrDist}_\Delta^\delta(mc_i, mc_j)$, is defined as $$CorrDist_\Delta^\delta(mc_i, mc_j) = \begin{cases} 0 & \text{if } mc_i \text{ is approx. linear} \\ & \text{dependent from } mc_j \wedge \\ & distance_{aff}(mc_i, mc_j) \leq \delta \\ 1 & \text{else} \end{cases}$$

Using this distance measure for DBSCAN which is performed within each partition finally yields a density-based correlation clustering model for each partition. Note that the ∈ parameter for DBSCAN must be set to 0 since the distance measure is binary. The minPts parameter, that we refer to as minMcs in the following to be able to distinguish this parameter from the one used in the static ERiC method, depends on the application.

Due to the partitioning, it might happen that some microclusters might span a subspace that lies within the subspace of surrounding microclusters whose subspaces have a higher dimensionality, e.g. a line cluster might be embedded into a plane shaped cluster. To detect such constellations, step (3) builds a hierarchy of the macroclusters generated during the previous step. The procedure borrowed from [1] iterates over the set of macroclusters and checks for each cluster $C_m$ whether there exists another cluster $C_n$ whose subspace is of a higher dimensionality and for which $CorrDist_\Delta^\delta(C_m, C_n)=0$ holds. If such cluster $C_n$ exists, it is a parent of $C_m$ unless $C_n$ is not an ancestor of $C_m$ already. Processing all macroclusters in this manner yields to a hierarchical, treelike structure in which clusters contained in a child node are embedded within the clusters contained its parent node. In the optional fourth step of our algorithm, we finally merge related macroclusters which leads to cross-partition macroclusters, i.e. clusters that contain microclusters which span subspaces of different dimensionalities with the premise that lower dimensional microclusters must be embedded within the microclusters of higher dimensionalities.

Figure 3:
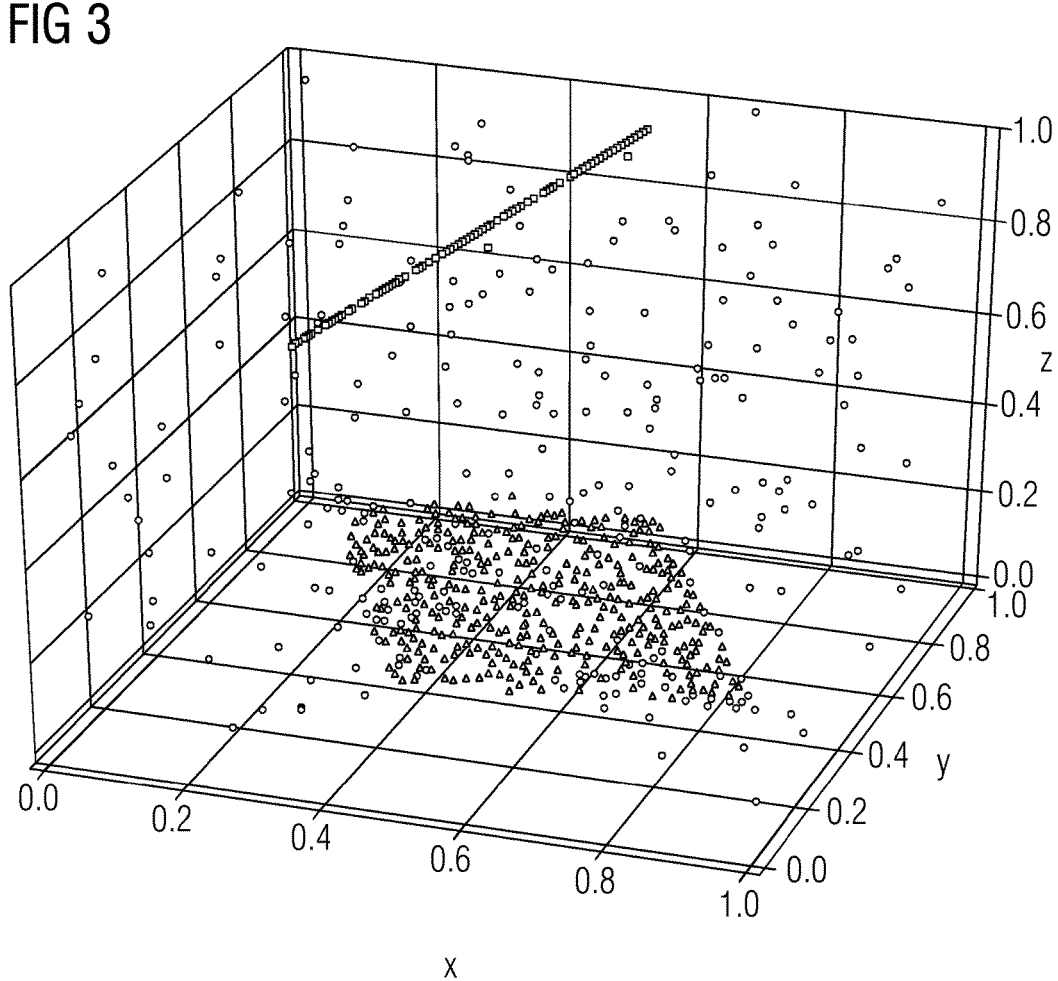

FIG. 3 shows the final clustering result of our sample data set. Note that full dimensional subspaces are treated as noise, depicted as round dots. Lower dimensional microclusters that obviously lie within a cluster can turn out to be handled as noise as well if they are not density-reachable for the DBSCAN algorithm. Regarding the lower right corner of the 2-dimensional cluster gives an example for this phenomenon. Although there exists a microcluster in the model retrieved by the online phase, this microcluster is labeled as noise during the offline phase since the microcluster is 1-dimensional but not density-reachable from another 1-dimensional microcluster (and vice versa) to satisfy the minMcs criterion for DBSCAN.

TABLE 1

| parameter | values | static∨stream | meaning |
|---|---|---|---|
| δ | .02 | both | threshold for the affine distance |
| Δ | .02 | both | allowed deviation from linear dependency |
| α | .85 | both | threshold to distinguish strong and weak eigenvectors |
| k | 17 | static | number of neighbors regarded to determine a points eigenspace |
| minPts | 8 | static | number of density-reachable points |
| buff_size | 10, 15, 20 | stream | number of points used to initialize microcluster |
| ∈ | .1, .15, .2, .3 | stream | allowed range for pre-initialization |
| minMcs | 1, 2, 3 | stream | number of density-reachable microclusters |
| λ | .4 | stream | intensity of the data stream |
| β | .3, .5, .7 | stream | ageing parameter |

In the following, we discuss the influence of the parameters that are required to be set by the user for CORRSTREAM, i.e. the ∈ parameter giving the allowed maximum distance of a data point to a microcluster center for the assignment step, the buff_size parameter which regulates the size of the buffer, or in other words the number of points used for the initial PCA, and the minMcs parameter that says how many microclusters must share a subspace so that a macrocluster can be created in the offline phase. Note that the latter parameter is ERiC specific and is not used in the ORCL US-like variant since the ORCLUS specific $k_0$ parameter, i.e. the parameter that gives the initial number of clusters which is reduced to k during the iterations, is implicitly given by the number of microclusters. The precision and recall values slightly decrease with increasing ∈ values which can be explained by the enlarged absorption radius as more distant points can be absorbed by a microcluster, especially during the initialization phase. The number of produced microclusters logically decreases and thus the processing time, too.

When considering various buffer sizes, the only measurement that drastically changes is the runtime which seems to benefit from larger buffers.

The minMcs parameter also does not affect the measured variables a lot. While precision and recall go down very slightly with an increasing number of microclusters that are necessary to build a macrocluster, the runtime and the overall number of microclusters are not affected at all. For instance, higher values of the minMcs parameter probably benefit from small ∈ values in terms of clustering quality but to the costs of an increased processing time.

In the following, means for detecting a significant change in a subspace's orientation are described.

A significant change in a subspace's orientation might be detected either if a new dimension appears or an old one disappears from the set of preferred vectors of the subspace when comparing the current state to a historic one. If the number of preferred dimensions does not change it might happen that the orientation changes anyway. Due to the use of an appropriate similarity measure, such kinds of changes in the orientation can be recognized. We therefore introduce the following distance measure to determine the similarity of two subspaces:

Definition 9. Let S(t) and S(t') be the two subspaces with $(u_1, u_2, \ldots, u_d)$ respectively $(v_1, v_2, \ldots, v_d)$ being the vectors that represent the orthonormal bases of the two subspaces. We define the distance d between the two subspaces S(t) and S(t') as follows:

$$d(S(t),S(t'))=\Sigma_{i=1}^d \text{argmin}_{j=1\ldots d} \cos(|\langle u_i, v_j \rangle|),$$

with $\langle .,. \rangle$ being the dot product.

This distance measure sums the occurring angles between the best fitting subspaces' eigenvectors which basically measures the rotation that might be happened to the subspace S during the time interval [t, t']. If the distance between S(t) and S(t') exceeds an application dependent threshold value, the change of orientation can be considered as significant.

When determined on a larger scale during the offline phase examining the macrocluster model, such changes in the orientation of a cluster's subspace in the macrocluster model may indicate behavior differently from the standard operation with even more reliability.

The following section describes a way for comparing the macrocluster model with historical models.

Cluster models such as the macrocluster model generated in the offline phase basically consist of extracted subspaces. One embodiment to compare two such cluster models is to measure the deviation for each cluster pair and finally compare the sums of deviations of each historical model. Having two cluster models, one representing a historical pattern fetched from a database and the other representing the current model, a cluster pair can be defined as two clusters, one from each model, that are identical/very similar. The similarity between two clusters can be determined by measuring the deviation of the subspaces represented by these clusters. The deviation between two clusters can be determined by checking if the vectors that span the subspace of the cluster gained from the current model are linear dependent from the vectors that span the subspace represented by the cluster gained from the standard pattern. Note that all cluster pairs are detected by comparing the subspace of one cluster, say x, to the subspaces of all clusters of the comparison model. The cluster, say y, with the minimum distance (or largest similarity) to x is regarded as the cluster equivalent, i.e. x and y build a cluster pair (x, y). A historical model that shows the minimal sum of deviations among all historical models to the current model can be taken as a comparison model.

The following section describes possible applications of the previous embodiments to the diagnostics of turbines and other rotating equipment.

The previously described embodiments of correlation clustering on data streams can be useful for turbine diagnostics in the sense that this unsupervised process is able to observe the operational behavior of the turbine (or other rotating equipment) continuously, and in contrast to supervised approaches in absence of labeled training data. An ageing mechanism allows to forget the influence of stale data to the current model which keeps the microcluster model permanently up to date. If a technician detects a failure state of the turbine he can request a current microcluster model representing the current state on demand. The microcluster model is translated into a macroclustering model during an offline phase. Having a database that stores documented historical operation patterns of a turbine, e.g. standard operation, loosened screw, etc., the extracted model from the offline phase can be compared with the patterns stored in the database and the most similar model can be retrieved. In case of documentation, the technician can determine the kind of failure in this way and is able to introduce following steps, e.g. stopping the turbine.

In case of a real time monitoring system, the proposed algorithms can ideally be used as a key mechanism to detect shifts or drifts from a standard operational state to a failure state. One option that is conceivable is the detection of abrupt failures. Such a failure might even be identifiable during the online phase. Newly arising microclusters or microclusters whose subspaces change their orientations significantly although they were stable during standard behavior may indicate an abrupt failure. On a larger scale such changes in the orientation of a cluster's subspace in the macrocluster model may indicate behavior differently from the standard operation with even more reliability. Insidious failures are harder to detect. In this case, a model comparison as described above can help to detect failure states.

At least some of the embodiments describe a novel streaming algorithm that is capable to detect arbitrarily oriented subspace clusters, i.e. correlation clusters. At least some of the embodiments use a two-step approach by dividing the procedure in an online and an offline phase. A newly proposed microcluster structure is used to aggregate similar data objects and thus compressing the volume of data significantly. At the same time this data structure provides all the necessary statistical information, gained from the incorporated data points, that are required for the offline phase to compute a clustering model which represents the structure of the data in total sufficiently.

The method can be executed by a processor such as a microcontroller or a microprocessor, by an Application Specific Integrated Circuit (ASIC), by any kind of computer, including mobile computing devices such as tablet computers, smartphones or laptops, or by one or more servers in a control room or cloud.

For example, a processor, controller, or integrated circuit of the computer system and/or another processor may be configured to implement the acts described herein.

The above-described method may be implemented via a computer program product including one or more computer-readable storage media having stored thereon instructions executable by one or more processors of a computing system. Execution of the instructions causes the computing system to perform operations corresponding with the acts of the method described above.

The instructions for implementing processes or methods described herein may be provided on non-transitory computer-readable storage media or memories, such as a cache, buffer, RAM, FLASH, removable media, hard drive, or other computer readable storage media. A processor performs or executes the instructions to train and/or apply a trained model for controlling a system. Computer readable storage media include various types of volatile and non-volatile storage media. The functions, acts, or tasks illustrated in the figures or described herein may be executed in response to one or more sets of instructions stored in or on computer readable storage media. The functions, acts or tasks may be independent of the particular type of instruction set, storage media, processor or processing strategy and may be performed by software, hardware, integrated circuits, firmware, micro code and the like, operating alone or in combination. Likewise, processing strategies may include multiprocessing, multitasking, parallel processing and the like.

The invention has been described in detail with reference to embodiments thereof and examples. Variations and modifications may, however, be effected within the spirit and scope of the invention covered by the claims. The phrase "at least one of A, B and C" as an alternative expression may provide that one or more of A, B and C may be used.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for detecting a failure in rotating equipment based on monitoring sensor data of the rotating equipment, wherein the method comprises:
   collecting, during an online phase, by a plurality of sensors of the rotating equipment, a sensor data stream, wherein the data stream consists of an ordered sequence of feature vectors, each feature vector representing measurements of at least one sensor of the plurality of sensors of the rotating equipment at a certain point in time,
   providing the sensor data stream to a processor,
   processing, by the processor, the sensor data stream
   representing the sensor data stream with a set of microclusters, each microcluster defining a subspace,
   for each new feature vector of the sensor data stream, updating the set of microclusters by
      calculating a correlation distance measure between the new feature vector and each microcluster,
         assigning the new feature vector to a microcluster with a smallest value for the correlation distance measure if the value is below a range parameter and updating the microcluster based on the new feature vector, or
         creating a new microcluster based on the new feature vector if all values for the correlation distance measure are above the range parameter,
   creating, during an offline phase, a macrocluster model containing macroclusters based on the microclusters by calculating a comparison measure between each pair of microclusters and grouping microclusters in a macrocluster if their value of the comparison measure is below a threshold, and
   comparing the macrocluster model with historical models by calculating a similarity measure, with each historical model representing either a standard operation or a failure state,
   choosing the historical model with the highest value of the similarity measure, and
   detecting a failure if the chosen historical model represents a failure state.

2. The method according to claim 1, with the additional step of
   detecting the possibility of a failure in real time
      if a change of orientation of the subspace of at least one of the microclusters exceeds a threshold, or
      if at least one new microcluster has been created.

3. The method according to claim 1, with the additional step of
   detecting the possibility of a failure in real time by continuously comparing newly created microclusters with a database containing microclusters representing known failure states.

4. The method according to claim 1, with each microcluster comprising
   a mean vector of feature vectors contained in the microcluster,
   a timestamp of the last incoming feature vector assigned to the microcluster,
   a buffer containing incoming feature vectors, if the microcluster has not been initialized, and
   an eigenvector matrix containing eigenvectors, and eigenvalues for the eigenvectors, if the microcluster has already been initialized.

5. The method according to claim claim 4,
   wherein for microclusters that have not been initialized, instead of calculating the correlation distance measure calculating an Euclidean distance between the new feature vector and the mean vector of the microcluster.

6. The method according to claim 4,
   wherein updating the microcluster based on the new feature vector comprises the alternatives of
      if the microcluster has not been initialized, inserting the new feature vector into its buffer, recalculating its mean vector and updating its timestamp, and if the buffer is now filled, initializing the microcluster by performing an initial Principal Component Analysis to calculate its eigenvectors and eigenvalues, or
      if the microcluster has already been initialized, performing an incremental Principal Component Analysis to recalculate its eigenvectors and eigenvalues, recalculating its mean vector and updating its timestamp.

7. The method according to claim 6,
   wherein the incremental Principal Component Analysis uses an exponential fading function assigning each feature vector a weight which decreases exponentially with time.

8. The method according to claim 4, with the additional step of
   periodically scanning the set of microclusters and deleting microclusters whose timestamp is older than a threshold value.

9. The method according to claim 1, wherein the macrocluster model is created by
   partitioning the set of microclusters,
   computing the macroclusters within each partition, and
   building a hierarchy of the macroclusters.

10. The method according to claim 9,
    with the additional step of merging related macroclusters from different partitions.

11. The method according to claim 1,
    wherein the comparison measure is calculated by comparing an orientation of the subspaces of the microclusters and grouping microclusters if the difference of the orientation of their subspaces is below a threshold.

12. The method according to claim 1,
    wherein the comparison measure computes a composition of an approximate linear dependency and an affine distance between two microclusters.

13. The method according to claim 9, with the additional step of
    ranking the historical models according to the value of the similarity measure, and
    outputting a ranked list of the historical models with the highest values of the similarity measure.

14. The method according to claim 1, wherein
    an ageing mechanism is used to forget an influence of old parts of the sensor data stream to the microclusters.

15. The method according to claim 1, with the additional step of
    adjusting operation of the rotating equipment and/or maintenance of the rotating equipment.

16. A system for monitoring sensor data of rotating equipment, the system comprising one or more processors which are programmed to perform the method according to claim 1.

17. A computer program product comprising a non-transitory computer-readable storage media having stored thereon:
instructions executable by one or more processors of a computer system, wherein execution of the instructions causes the computer system to perform the method according to claim 1.

18. The method of claim 1, wherein the method is implemented by a computer readable program code having program commands, wherein the computer readable program code having program commands is stored on a computer program product comprising a non-transitory computer readable hardware storage device, and
wherein the computer readable program code is configured to be executed by one or more processors of a computer system.

19. A method for adjusting operation of rotating equipment in response to monitoring sensor data of the rotating equipment, wherein the method comprises
collecting, during an online phase, by a plurality of sensors of the rotating equipment, a sensor data stream, wherein the data stream consists of an ordered sequence of feature vectors, each feature vector representing measurements of at least one sensor of the plurality of sensors of the rotating equipment at a certain point in time,
processing the sensor data stream by a processor,
representing the sensor data stream with a set of microclusters, each microcluster defining a subspace,
for each new feature vector of the sensor data stream, updating the set of microclusters by
calculating a correlation distance measure between the new feature vector and each microcluster, and
assigning the new feature vector to a microcluster with a smallest value for the correlation distance measure if the value is below a range parameter and updating the microcluster based on the new feature vector, or
creating a new microcluster based on the new feature vector if all values for the correlation distance measure are above the range parameter, and
detecting at least one of a change of orientation of the subspace of at least one of the microclusters, wherein the change of orientation exceeds a threshold, and creation of a new microcluster,
creating, during an offline phase, a macrocluster model containing macroclusters based on the microclusters by calculating a comparison measure between each pair of microclusters and grouping microclusters in a macrocluster if their value of the comparison measure is below a threshold, and
comparing the macrocluster model with historical models by calculating a similarity measure, with each historical model representing either a standard operation or a failure state,
choosing the historical model with the highest value of the similarity measure,
detecting a failure if the chosen historical model represents a failure state, and
adjusting operation of the rotating equipment in response detecting the failure.

20. The method of claim 19, wherein the rotating equipment is one of a pump, a fan, a compressor, and a turbine.

* * * * *